Figure 1:
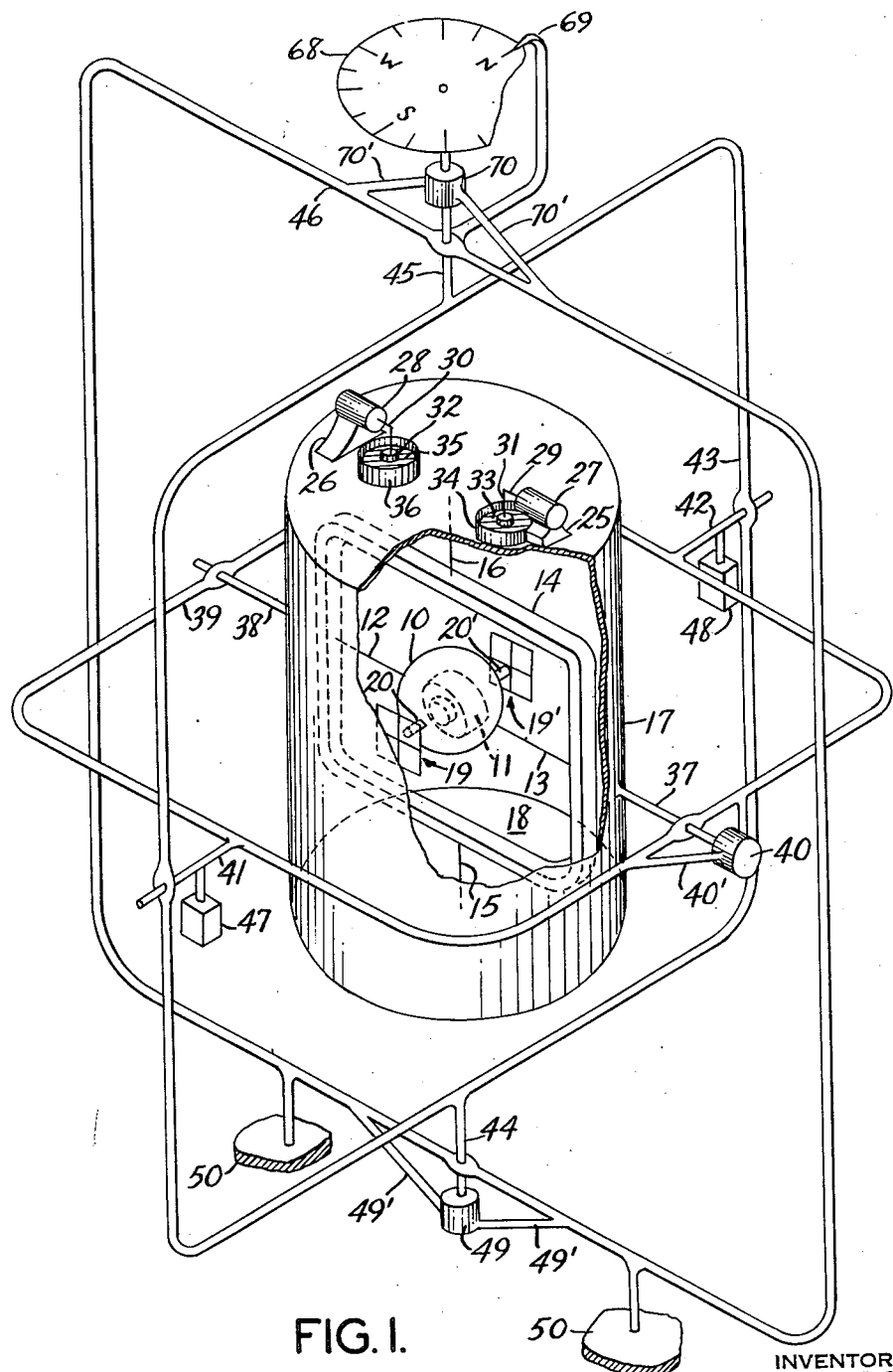

May 4, 1954

R. L. BISHOP 2,677,194

GYROSCOPIC COMPASS

Filed Nov. 19, 1949

2 Sheets-Sheet 1

FIG. I.

INVENTOR
RONALD L. BISHOP
BY
his ATTORNEYS

Patented May 4, 1954

2,677,194

UNITED STATES PATENT OFFICE 2,677,194

GYROSCOPIC COMPASS

Ronald L. Bishop, Oceanside, N. Y., assignor to Arma Corporation, Brooklyn, N. Y., a corporation of New York Application November 19, 1949, Serial No. 128,366

20 Claims. (Cl. 33—226)

The subject matter of this patent may be used by or for the Government for governmental purposes without the payment of any royalties.

This invention relates to gyroscopic instruments, and has particular reference to gyrocompasses of the submerged gyroscope type exemplified generally by Patents Nos. 1,501,886 and 1,589,039, although the invention is not limited to that type of gyrocompass but is readily adaptable to other types.

In conventional types of gyrocompasses, the correcting torques are applied by a system including torque motors energized by the displacement responsive detectors, slip rings, amplifiers and associated equipment of a generally complicated and bulky nature, and which requires a precisely regulated power supply in order to function effectively and accurately.

In accordance with the present invention, a gyroscopic instrument, particularly adaptable to gyrocompasses, is provided, in which the gyroscope wheel is linked to its supporting inner gimbal system by elastic or spring-like members arranged to apply the correcting torques to the gyroscope by displacing the follow-up gimbals angularly from the plane of the gyroscope wheel and by a predetermined amount and, in the case of a submerged gyroscope type of instrument, the elastic members also preclude the translational movement of the gyroscope caused by changing conditions of the supporting liquid. This mounting arrangement for the gyroscope enables displacement of the follow-up members and thereby twisting of the elastic supporting members of the inner gimbal system to apply the correcting torques directly to the gyroscope, without requiring a complicated torque applying system or a precise regulation of the power supply therefor.

In a preferred embodiment of this invention, a horizontal spin axis gyroscope is mounted in a sealed shell immersed in a tank of liquid and suspended for neutral flotation therein and connected by two horizontal elastic members to a vertical gimbal ring which is also suspended in neutral flotation in the tank and in turn is linked to the top and bottom thereof by vertical elastic members. The tank is supported in an outer gimbal system in which the horizontal gimbal ring is made pendulous and is mounted in a vertical follow-up gimbal ring. In this arrangement the elastic members, preferably in the form of fine torsion wires, apply torques to the gyroscope when twisted, and also prevent any undesirable translational motion of the submerged shell.

Hence, rotation of the tank with respect to the gyroscope about either the vertical or the horizontal axis causes the corresponding torsion members to twist and thereby apply torques to the gyroscope, and these torques supply the forces necessary to (1) make the compass axis settle on the meridian, (2) apply the speed and course correction, and (3) compensate for the vertical component of earth's rotation at the compass position, and are regulated by electrical signals which cause the customary follow-up motors to displace the follow-up members about the proper axes with respect to the gyroscope. A given angular displacement of the follow-up member from the gyroscope is produced by matching the proportional output voltage of an electrical pickup device with an input signal voltage, properly scaled to produce the desired angular displacement and derived from the same power source.

It will be seen that the new gyroscopic instrument of this invention enables the use of simpler and less bulky apparatus for applying correcting torques and, since the pickup output voltage and the input signal voltage are derived from the same power source, both are affected equally by the fluctuations in frequency and magnitude of the voltage supply so that the angular displacement of the follow-up member from the gyroscope is unaffected during wide fluctuations of the power supply voltage because the signal and pickup voltages remain matched. Furthermore, since the applied correcting torques are functions of the twist in the torsion members, they also are functions of the displacement of the follow-up system from the gyroscope, and therefore, are insensitive to comparatively wide fluctuations of the amplitude and frequency of the power supply voltage. Accordingly, the precisely regulated power supply required for accurate control in conventional gyroscopic instruments is unnecessary with the present invention.

Figure 2:
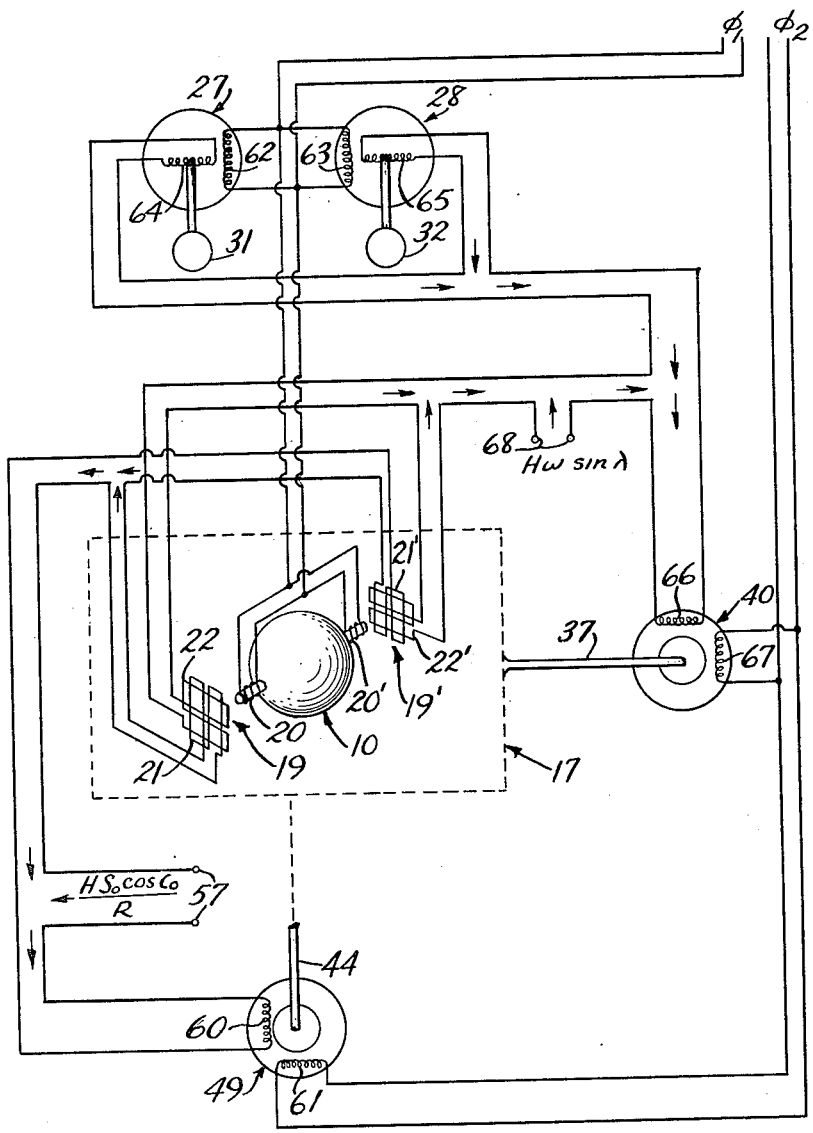

For a more complete understanding of the invention, reference may be had to the accompanying drawings in which:

Figure 1 is a perspective view of a gyrocompass embodying the invention, the tank being shown as partly broken away to reveal its contents; and Fig. 2 is a schematic wiring diagram of the electrical system of the gyrocompass of Fig. 1.

Referring to Fig. 1, numeral 10 designates a spherical shell enclosing a horizontal axis gyroscope wheel 11, which is supported in a fixed position relative to sphere 10. Attached to the outer surface of sphere 10, at points which are diametrically opposite one another and which lie on the horizontal axis perpendicular to the vertical plane containing the gyroscope spin axis, are horizontal torsion members 12 and 13, the outer ends of which are secured to vertical gimbal ring 14, which is suspended by vertical torsion members 15 and 16. These torsion members are attached to vertical gimbal ring 14 at points lying in the vertical axis through the center of mass of gimbal ring 14 and sphere 10 and its contents, and have their outer ends secured to tank 17 which is filled with a suitable liquid 18, such as oil. Accordingly, gimbal ring 14 and sphere 10 are completely submerged in the liquid 18, and are of such size and weight that they are essentially in neutral equilibrium in liquid 18.

Inasmuch as temperature changes and other conditions affect the specific gravity of the liquid 18, sphere 10 and gimbal ring 14 are practically never in exact equilibrium but have a slight tendency to sink or float, depending upon the condition of the liquid at the time. This tendency is counteracted by horizontal torsion members 12 and 13 and vertical torsion members 15 and 16, which, in addition to performing their primary function, to be described, prevent any appreciable translational movement of sphere 10 and gimbal ring 14 within the supporting liquid 18 in tank 17.

Positioned opposite the ends of the gyroscope spin axis is an inductive pickup device 19, 19' which is preferably of the type disclosed in detail in Patent No. 2,421,247, issued May 27, 1947. Adapted to the arrangement of this invention, pickup device 19, 19' is made in two like parts, part 19 including an electromagnet 20 mounted on sphere 10, and pickup windings 21, 22 mounted in the field of electromagnet 20 on the wall of tank 17. As is shown particularly in Fig. 2, windings 21 and 22 are wound so that a vertical displacement of electromagnet 20 from the neutral position opposite the magnetic center of winding 22 produces an output voltage only in winding 22. The amplitude of the output voltage is proportional to the displacement of electromagnet 20 from its neutral position, while the phase of the output voltage depends on the direction of the displacement of the electromagnet from its neutral position, with the phase reversing when the direction of displacement reverses. Similarly, a horizontal displacement of electromagnet 20 from the neutral position opposite the magnetic center of winding 21 produces an output voltage only in winding 21, the amplitude of which is proportional to the displacement and the phase of which depends on the direction of the horizontal displacement.

The other part 19' of the pickup device is similar to the first part 19, and is composed of electromagnet 20' and pickup windings 21', 22' which are like the corresponding parts 20, 21 and 22, and function so as to eliminate spurious outputs due to translational motion of sphere 10. Pickup windings 22, 22' are therefore effectively connected in series opposition during vertical translational motion of sphere 10, and in series aiding during actual rotational displacement of sphere 10 about the axis through torsion members 12, 13, so that the total output voltage of windings 22, 22' is proportional only to angular displacements of gyroscope 11 about that axis. The appropriate connections are shown in Fig. 2, as are those for pickup windings 21, 21', which accordingly are effectively connected in series opposition during horizontal translational motion of sphere 10, and in series aiding during rotational displacement of sphere 10 about the axis through torsion members 15, 16, so that the output voltage of windings 21, 21' is proportional only to the angular displacement of gyroscope 11 about that axis.

Mounted on the outer top surface of tank 17 by supports 25 and 26 are the respective stator windings 62 and 63 of induction type electrical pickup devices 27 and 28, the shafts 29 and 30 of the respective rotor windings 64 and 65 of which carry pendulous weights 31 and 32 which accordingly constitute gravity pendulums. Pendulous weight 31 is submerged in a liquid 33 of low viscosity held in container 34 mounted on tank 17. The movements of the pendulum of pickup device 27 are therefore lightly damped, providing a link to earth. Pendulous weight 32 is submerged in a liquid 35 of high viscosity held in container 36 mounted on tank 17 and therefore the movements of the pendulum of pickup device 28 are highly damped. It will be understood that containers 34, 36 are illustrated only schematically in Fig. 1 and that means will be provided to preclude loss of liquid 33, 35 and to keep pendulums 31, 32 always submerged in corresponding liquids 33, 35 regardless of the motion of tank 17 in operation.

Tank 17 is supported by horizontal shafts 37 and 38, which are substantially perpendicular to the vertical plane containing the gyroscope spin axis, and which are journalled in horizontal gimbal ring 39. Shaft 37 carries at its outer end the rotor of a two-phase induction motor 40, the stator of which is secured to gimbal ring 39 by a suitable bracket 40'.

Shafts 41 and 42 of gimbal ring 39 are journalled in vertical gimbal ring 43 whose vertical shafts 44 and 45 are journalled in stationary vertical frame 46 secured to the platform 50 of the vehicle carrying the gyrocompass. Weights 47 and 48 are secured to shafts 41 and 42 of gimbal ring 39 to add pendulousness and thus stabilize the tank 17 about the axis through shafts 41, 42.

Shaft 44 carries at its lower end the rotor of a two-phase induction motor 49, the stator of which is secured by suitable brackets 49' to stationary frame 46. The upper shaft 45 carries compass card 68 and drives the same relatively to stationary index 69 which is attached to stationary frame 46. Shaft 45 also carries the rotor winding of self-synchronous transmitter 70, the stator winding of which is attached to stationary frame 46 by suitable brackets 70'.

Referring particularly to Fig. 2, tank 17 is indicated schematically by the dotted rectangle, and the electromagnets 20, 20' and pickup coils 21, 21', 22, 22' are shown in isometric projection to indicate their relative positions more clearly, with the phases of a two-phase alternating voltage source of a conveniently available frequency and voltage indicated as $\phi_1$ and $\phi_2$. Electromagnets 20, 20' and stator windings 62, 63 of electrical pickup devices 27 and 28, respectively, are energized by $\phi_1$.

It will be observed that the pickup windings 21, 21' are connected in series with terminals 57 and control field winding 60 of motor 49, the main field winding 61 of which is energized by $\phi_2$. The voltage input at terminals 57 is proportional to the speed and the cosine of the course of the vehicle, and is received from a source to be described. For the present, it may be assumed that the vehicle is not moving so that the voltage input at 57 is zero.

It will be seen that any displacement of sphere 10 with respect to tank 17 about the axis through torsion members 15, 16 will cause respective electromagnets 20 and 20' to induce a voltage in pickup windings 21, 21' proportional to the degree of displacement and that this voltage will be applied to the control field winding 60 of motor 49 which accordingly drives frames 43 and 39 and tank 17 in the proper direction to reduce the said displacement to zero and bring frame 43 and tank 17 back into positional agreement with the spin axis of the gyroscope 11, thereby providing the azimuth follow-up action of the gimbal system.

Any tilt of tank 17 about the axis 37, 38 results in a displacement of pendulums 31 and 32 from their zero positions with corresponding displacement of rotor windings 64 and 65, respectively, thereby causing voltages to be induced in said rotor windings, the amplitudes of which are proportional to the displacements of the pendulums while the phase corresponds to the direction of displacement. For equal displacement of pendulums 31 and 32, in the same direction with respect to tank 17, the amplitude of the output voltage of pickup 28 is less than the amplitude of the output voltage of pickup 27 because the output voltage gradient of pickup 28 is made smaller than that of pickup 27, by design, and is of opposite phase. The respective rotor windings 64, 65 of pickup devices 27, 28 are electrically collected in series with pickup winding 22, 22', terminals 68 and control field winding 66 of two-phase induction motor 40.

The amplitude of the voltage input to terminals 68 is proportional to $H\omega \sin \lambda$ where H is the angular momentum of the gyroscope wheel 11; $\omega$ is the angular velocity of the earth and $\lambda$ is the latitude of the compass location, the purpose of which will be described. For the present, it may be assumed that the compass is at the earth's equator so that $H\omega \sin \lambda$ is zero, and the voltage at terminals 68 is zero.

The main field winding 67 of motor 40 is energized from $\phi_2$ so that when the tank 17 is tilted about axis 37, 38, the voltage supplied to control field winding 66 causes motor 40 to restore tank 17 to the position which makes the algebraic sum of the voltages of pickups 27, 28, 22, 22', and terminals 68 equal to zero, thereby deenergizing control field winding 66 of motor 40.

In operation of the gyroscopic system of this invention, it will be assumed in the interest of simplicity that the control field winding 66 is totally deenergized, although this condition is rarely fully realized in practice, due to the numerous motions occurring simultaneously, until the compass comes to rest on the meridian. Also, in the interest of simplicity, and with reference to Fig. 1, all movements of the spin axis of the gyroscope in azimuth will be described as clockwise or counterclockwise, as viewed from above, while all displacements of the gyroscope spin axis in elevation from the null axis of tank 17, i. e., the axis through the magnetic centers of pickup coils 22, 22', the displacements of pendulums 31, 32 with respect to tank 17, and all movements of tank 17 in elevation will be described as clockwise or counterclockwise, as viewed from the motor 40 end of the compass. The output voltages of pickups 27, 28, 22, 22' will be described as clockwise and counterclockwise in relation to direction of rotation of motor 40 when viewed from the closed end of the motor as rotated by these voltages.

Assuming that the gyroscope is set spinning with its axis horizontal and displaced clockwise from the meridian in a fixed location, that the gyroscope is spinning in a clockwise direction as viewed from the easterly end of the spin axis, and that the pendulums 31 and 32 are not initially displaced from zero, it follows that the horizontal component of earth's rotation causes the easterly end of the gyroscope spin axis to rise, thus creating a counterclockwise displacement of the gyroscope spin axis from its initial horizontal position, in elevation. This displacement is described as it appears to an observer, and the terms "clockwise" and "counterclockwise" are used to indicate the relative positions of the axes only. This counterclockwise displacement of the spin axis means the displacement in elevation of electromagnets 20, 20' from the mid-points of pickup coils 22, 22', i. e., the null axis of tank 17, which causes a counterclockwise signal to be applied to control field winding 66 of motor 40, so that motor 40 turns tank 17 in a counterclockwise direction until the electromagnets 20, 20' are again opposite the null axis of tank 17, i. e., the mid-points of pickup coils 22, 22'.

The tilt of the tank 17 during this operation causes pendulum 31 to displace rotor winding 64 of pendulum pickup device 27 in a clockwise direction from the zero position, thereby inducing a counterclockwise voltage in that winding, which is impressed on control field winding 66 to cause motor 40 to turn tank 17 in a counterclockwise direction with a corresponding counterclockwise displacement of the null axis of tank 17 from the gyroscope spin axis, in elevation. When the resulting clockwise output voltage of pickup windings 22, 22' is exactly equal in amplitude to the counterclockwise output voltage of pickup 27, the control field winding 66 is deenergized and motor 40 accordingly stops.

It is noted that the output voltage of pickup device 27 is in the counterclockwise sense for a clockwise displacement of its rotor and that sense has been selected in order that a tilt of the gyroscope spin axis from the horizontal causes a relatively greater tilt of tank 17 from the vertical and causes torsion members 12, 13 to twist and apply the torque to gyroscope 11 in the counterclockwise direction so that, for the assumed direction of spin of gyroscope 11, the spin axis precesses toward the meridian.

The tilt of tank 17 is dependent on the relative sensitivities of pickups 27 and 22, 22'. Thus, for stability of the compass the voltage output of pickup 27 for a particular displacement of tank 17 from the vertical is less than the output voltage of pickup windings 22, 22' for an equal displacement of the null axis of tank 17 from the gyroscope axis. In the preferred arrangement the output voltages of pickups 27 and 22, 22' are proportioned in a manner such that a tilt of gyroscope 11 of one minute of angle causes a tilt of approximately three minutes in tank 17.

The rotation of the earth continues to increase the apparent tilt of the gyroscope spin axis from the horizontal, thereby causing motor 40 to increase the counterclockwise displacement of the null axis of tank 17 from the gyroscope spin axis, which has the effect of increasing the rate of precession of the gyroscope toward the meridian as long as the spin axis is displaced clockwise in azimuth from the meridian.

Because pendulum 32 is heavily damped, it remains comparatively motionless during the initial stages of the operation just described, but the continued tilt of tank 17 eventually causes pendulum 32 to displace the rotor of pickup device 28 in a clockwise direction from its zero position and a corresponding clockwise voltage is induced in its rotor winding 65. Because of the series opposition connection between the rotor windings 64 and 65, the clockwise voltage induced in winding 65 opposes the counterclockwise output voltage of rotor winding 64 of pendulum pickup device 27, so that the clockwise voltage of pickup windings 22, 22' becomes greater than the algebraic sum of the output voltages of the pendulum pickup devices 27 and 28. Accordingly, motor 40 drives tank 17 in a clockwise direction in elevation, thereby reducing the counterclockwise displacement of the null axis of tank 17 from the gyroscope spin axis, which in turn reduces the counterclockwise twist of torsion members 12, 13 and the rate of counterclockwise precession of gyroscope 11 in azimuth as the spin axis nears the meridian.

As the gyroscope spin axis crosses the meridian, the apparent tilting of the gyroscope spin axis from the horizontal due to earth's rotation ceases and then begins to decrease, as the spin axis is displaced counterclockwise from the meridian in azimuth. The counterclockwise displacement of the null axis of tank 17 from the gyroscope spin axis in elevation then tends to be increased, but the increased clockwise output of pickup windings 22, 22' causes motor 40 to continue driving tank 17 in the clockwise direction in elevation. This action again decreases the counterclockwise twist in torsion members 12, 13, so that the rate of counterclockwise precession of the gyroscope spin axis in azimuth is further reduced.

The apparent tilt of the gyroscope spin axis from the horizontal continues to decrease and tank 17 is continuously driven toward the vertical position until a position is eventually reached where the counterclockwise output voltage of pickup device 27 is equal to the clockwise output voltage of pickup device 28, since the displacement of pendulum 31 decreases more rapidly than the displacement of pendulum 32. In this condition of the system, torsion members 12, 13 are completely untwisted, because the output of pickup windings 22, 22' is zero as motor 40 tends to keep the algebraic sum of the output voltages of pickups 27, 28, 22, 22' equal to zero. When this condition is reached, the counterclockwise precession of the gyroscope spin axis in azimuth is reduced to zero.

A continued decrease in the apparent tilt of the spin axis of gyroscope 11 from the horizontal as the earth rotates tends to produce a clockwise output voltage in pickup 22, 22', thereby energizing motor 40 to drive tank 17 in a clockwise direction in elevation, thereby causing a decrease counterclockwise in the output voltage of pickup 27 and leaving a net clockwise signal due to pickups 28, 22, 22'. Tank 17 is continued to be driven clockwise in elevation until there is a clockwise displacement of the null axis of tank 17 from the spin axis of gyroscope 11 such that the resulting counterclockwise output voltages of pickups 27, 22, 22' are equal to the clockwise output voltage of pickup 28. Torsion members 12, 13 are therefore twisted in a clockwise direction to apply a torque to gyroscope 11 and the resulting clockwise precession turns spin axis in azimuth back toward the meridian.

The continuously decreasing apparent tilt of the gyroscope axis from the horizontal causes tank 17 to be driven to the vertical position where the output voltage of pickup 27 becomes zero and the clockwise output voltage of pickup 28 is equal and opposite to the counterclockwise output voltage of pickup windings 22, 22' which then tends to decrease with the apparent decrease of tilt of the gyroscope spin axis from the horizontal and the net clockwise signal at motor 40 due to the clockwise output voltage of pickup 28 causes tank 17 to be driven clockwise in elevation. Pendulum 31 is therefore displaced in a counterclockwise direction and the resulting clockwise output voltage of pickup 27 aids the clockwise output voltage of pickup 28, so that tank 17 is driven clockwise until the counterclockwise output voltage of pickup windings 22, 22' balances the combined clockwise outputs of pickups 27, 28. The clockwise twist of torsion members 12, 13 is thereby increased and the rate of clockwise precession of the gyroscope spin axis toward the meridian is increased accordingly.

The continued clockwise tilt of tank 17 causes pendulum 32 to approach the vertical, so that the output voltage of the corresponding pickup device 28 decreases from the clockwise signal to zero and then increases counterclockwise from zero. During a clockwise tilt of tank 17, the output of pickup device 27 is always clockwise, so that the output of pickup 28 is first aiding and then opposing the output of pickup 27.

Continuing the analysis of the compass action in the manner outlined above, it will be seen that the rate of precession of the gyroscope in azimuth is increased during motion of the spin axis toward the meridian, and is decreased as the spin axis moves away from the meridian, thereby effectively damping the oscillation of the gyroscope spin axis about the meridian and causing the spin axis to settle on the meridian in a manner analogous to that effected by the liquid damping means commonly used in gyroscopic compasses.

The correction for the vertical component of the earth's rotation is automatically applied as in the conventional pendulous gyroscope, where the spin axis settles on the meridan at an angle to the horizontal, so that the precession caused by the pendulum is equal and opposite to the apparent precession due to the earth's rotation. Thus, tank 17 is driven to a position where the sum of the output voltages of pickups 27, 28, while in the steady state is equal and opposite to the voltage output of pickup windings 22, 22' and the null axis of tank 17 is displaced from the gyroscope spin axis by an angle such that the torque applied to the gyroscope 11 by the twisted torsion members 12, 13 is equal to aforementioned $H\omega \sin \lambda$. The resulting precession in azimuth constitutes the correction for the vertical component of the earth's rotation.

In the embodiment of the invention just described, the inclined position of tank 17 and the consequent steady displacement of pendulums 31, 32 from their zero position may interfere with the normal operation of the pendulums, wherefore a counteracting signal proportional to $H\omega \sin \lambda$ is introduced at terminals 68, thus causing motor 40 to drive tank 17 until the algebraic sum of the output voltages of pickups 22, 22', 27, 28 is equal to the $H\omega \sin \lambda$ signal at terminals 68, with the result that control field winding 66 is deenergized. Proper scaling of the $H\omega \sin \lambda$ signal causes tank 17 to be vertical in the steady state, while the gyroscope spin axis becomes inclined to the horizontal at an angle such that the torque applied by torsion members 12, 13 is equal to $H\omega \sin \lambda$.

When the supporting vehicle has a northerly component of velocity, a voltage is derived which is proportional to $$\frac{HSo \cos Co}{R}$$

where H is the angular momentum of the gyroscope wheel, So is the speed of the vehicle, Co is the course of the vehicle, and R is the radius of the earth. This voltage is derived from $\phi_1$ in the usual manner by electromechanical elements, not shown, and forming no part of the present invention. This voltage is applied to terminals 57 and so is added to the output of windings 21, 21' of pickup 19, 19', thereby causing motor 49 to turn tank 17 about sphere 10 until the output voltage of windings 21, 21' is equal and opposite to the signal $$\frac{HSo \cos Co}{R}$$

so that the voltage applied to control field winding 60 is zero. Tank 17 is accordingly displaced angularly with respect to gyroscope 11 about an axis through vertical torsion members 15, 16, simultaneously twisting said members through an angle such that the torque applied to gyroscope 11 by said members is equal to $$\frac{HSo \cos Co}{R}$$

and the precession of the gyroscope in elevation resulting therefrom, is the speed and course correction for the compass. For this reason the indicated course, as read on dial 68, is slightly in error on courses other than east or west. The maximum discrepancy occuring for courses due north or south is held to less than one-quarter of a degree by suitable choice of torsion members 15, 16. However, the angle of error is calculable and for increased accuracy, the error is automatically corrected in the transmission of the course from self-synchronous transmitter 70 to remote repeaters and other receiving equipment, by methods well known to those skilled in the art.

Although the invention has been illustrated and described herein as applied to a gyrocompass and of the submerged gyroscope type, it is to be understood that the invention is not so limited, but may be used with equal facility on other gyroscopic instruments and in gyrocompasses other than the submerged gyroscope type, for example, in gyroscopes which are supported conventionally by a suspension shaft or shafts, the correcting torque may be applied about the suspension axis or axes by resilient means which resist relative rotational movement between the shaft and its supporting member as the member is angularly displaced, and that the invention is otherwise susceptible to changes in form and detail within the scope of the appended claims.

I claim:

1. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, an elastic element suspending said ring on said member for movement about an axis at right angles to said first axis, electrical pickup means interposed between said gyroscope and said member and responsive to relative movement between them for developing a voltage in accordance with the degree of said movement, electrical motive means connected to said member for driving the same about one of said coordinate axes to impose a correcting torque on said gyroscope through at least one of said suspending elastic elements, and operative electrical connections between said pickup means and said motive means.

2. In gyroscopic apparatus adapted to be mounted on an unstable support, the combination of a gyroscope, a gimbal ring, a pair of aligned elastic elements suspending said gyroscope in said ring for movement about an axis, a member mounted on said support for movement about coordinate axes, one of which is substantially coincident with said first axis, a pair of aligned elastic elements suspending said ring on said member for movement about a substantially vertical axis, electrical pickup means interposed between said gyroscope and said member and responsive to relative movement between them for developing a voltage in accordance with the degree of said movement, electrical motive means connected to said member for driving the same about one of said coordinate axes to impose a correcting torque on said gyroscope through at least one pair of said suspending elastic elements, and operative electrical connections between said pickup means and said motive means.

3. In gyroscopic apparatus adapted to be mounted on an unstable support, the combination of a gyroscope, a gimbal ring, a torsion filament suspending said gyroscope in said ring for movement about an axis, a member mounted on said support for movement about coordinate axes, one of which is substantially coincident with said first axis, a torsion filament suspending said ring on said member for movement about a substantially vertical axis, electrical pickup means interposed between said gyroscope and said member and responsive to relative movement between them for developing a voltage in accordance with said movement, electrical motive means connected to said member for driving the same about one of said coordinate axes to impose a correcting torque on said gyroscope through at least one of said suspending torsion filament elements, and operative electrical connections between said pickup means and said motive means.

4. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a winding in said field responsive to relative movement between said electromagnet and winding for inducing in said winding a voltage in accordance with said movement, electrical motive means connected to said member for driving the same about one of said coordinate axes to impose a correcting torque on said gyroscope through at least one of said suspending elastic elements, and operative electrical connections between the winding of said pickup means and said motive means.

5. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a winding in said field responsive to relative movement between said electromagnet and winding for inducing in said winding a voltage in accordance with said movement, electrical motive means connected to said member for driving the same about one of said coordinate axes to impose a correcting torque on said gyroscope through at least one of said suspending elastic elements, said motive means having main and control field windings, a two-phase alternating current source, electrical connections between one phase of said source and said electromagnet for energizing the same, electrical connections between the other phase of said source and the main field winding of said motive means, and operative electrical connections between said pickup means and the control field winding of said motive means.

6. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and responsive to relative movement between them for developing a voltage in accordance with said movement, electrical motive means connected to said member for driving the same about one of said coordinate axes to impose a correcting torque on said gyroscope through at least one of said suspending elastic elements, operative electrical connections between said pickup means and said motive means, and second electrical pickup means interposed in said last-named connections and responsive to a tilt of said member relatively to the vertical and developing a voltage in accordance with said tilt for modifying the movement of said member by said motive means.

7. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and responsive to relative movement between them in one direction for developing a voltage in accordance with said movement, second electrical pickup means interposed between said gyroscope and said member and responsive to relative movement between them in another direction for developing a voltage in accordance with said last-named movement, electrical motive means connected to said member for driving the same about said coordinate axes to impose a correcting torque on said gyroscope through at least one of said suspending elastic elements, and operative electrical connections between said pickup means and said motive means.

8. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and responsive to relative movement between them in one direction for developing a voltage in accordance with said movement, second electrical pickup means interposed between said gyroscope and said member and responsive to relative movement between them in another direction for developing a voltage in accordance with said last-named movement, electrical motive means connected to said member for driving the same about one of said coordinate axes to impose a correcting torque on said gyroscope through at least one of said suspending elastic elements, operative electrical connections between said first pickup means and said motive means, second electrical motive means connected to said member for driving the same about the other of said coordinate axes to impose a correcting torque on said gyroscope through at least one of said suspending elastic elements, and operative connections between said second pickup means and said second motive means.

9. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a winding in said field responsive to relative movement between them in one direction for developing a voltage in accordance with said movement, second electrical pickup means interposed between said gyroscope and said member and including a winding in said magnetic field responsive to relative movement between said electromagnet and winding in another direction for inducing in said winding a voltage in accordance with said last-named movement, electrical motive means connected to said member for driving the same about said coordinate axes to impose a correcting torque on said gyroscope through at least one of said suspending elastic elements, and operative electrical connections between the windings of said pickup means and said motive means.

10. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose a correcting torque on said gyroscope through at least one of said suspending elastic elements, and operative electrical connections between the windings of said pickup means and the corresponding said motive means.

11. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose a correcting torque on said gyroscope through at least one of said suspending elastic elements, operative electrical connections between the windings of said pickup means and the corresponding said motive means, and third electrical pickup means interposed in one of said last-named connections and responsive to a tilt of said member relatively to the vertical for developing a voltage in accordance with said tilt for modifying the movement of said member by the corresponding motive means.

12. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and responsive to relative movement between them in one direction for developing a voltage in accordance with said movement, second electrical pickup means interposed between said gyroscope and said member and including an electromagnet creating a magnetic field and a winding in said field responsive to relative movement between said electromagnet and winding for inducing in said winding a voltage in accordance with said last-named movement, a pair of electrical motive means connected to said member for driving the same about said coordinate axes to impose correcting torques on said gyroscope through at least one of said suspending elastic elements, each said motive means having main and control field windings, a two-phase alternating current source, connections between one phase of said source and said electromagnet for energizing the same, connections between the other phase of said source and the main field windings of said motive means, and operative electrical connections between the windings of said pickup means and the control field winding of the corresponding said motive means.

13. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose correcting torques on said gyroscope through at least one of said suspending elastic elements, each said motive means having main and control field windings, a two-phase alternating current source, connections between one phase of said source and said electromagnet for energizing the same, connections between the other phase of said source and the main field windings of said motive means, operative electrical connections between one winding of said pickup means and the control field winding of one of said motive means for driving said member about one of said coordinatae axes, and operative electrical connections between the other winding of said pickup means and the control field winding of the other said motive means for driving said member about the other coordinate axis.

14. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and responsive to relative movement between them for developing a voltage in accordance with said movement, electrical motive means connected to said member for driving the same about one of said coordinate axes to impose a correcting torque on said gyroscope through at least one of said suspending elastic elements, second electrical pickup means including a pendulum pivoted about an axis lying in the plane of one of said coordinate axes and responsive to a tilt of said member, an energized winding, a second winding carried by said pendulum and movable thereby in the field of said last-named winding for developing a voltage in accordance with the movement of said pendulum, and means in said connections for adding the last-named voltage to thereby modify the operation of said motive means.

15. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and responsive to relative movement between them for developing a voltage in accordance with said movement, electrical motive means connected to said member for driving the same about one of said coordinate axes to impose a correcting torque on said gyroscope through at least one of said suspending elastic elements, second electrical pickup means including a pendulum pivoted about an axis lying in the plane of one of said coordinate axes and responsive to a tilt of said member about said last-named axis, damping means for said pendulum, an energized winding, a second winding carried by said pendulum and movable thereby in the field of said last-named winding for developing a voltage in accordance with the movement of said pendulum, and means in said connections for adding the last-named voltage to thereby modify the operation of said motive means.

16. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose a correcting torque on said gyroscope through at least one of said suspending elastic elements, several electrical connections between the windings of said pickup means and the corresponding said motive means, third electrical pickup means including a pendulum pivoted about an axis lying in the plane of one of said coordinate axes and responsive to a tilt of said member, an energized winding, a second winding carried by said pendulum and movable thereby in the field of said last-named winding for developing a voltage in accordance with the movement of said pendulum, and means in one of said last-named connections for adding the pendulum voltage to thereby modify the operation of the corresponding motive means.

17. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose a correcting torque on said gyroscope through at least one of said suspending elastic elements, each said motive means having main and control field windings, a two-phase alternating current source, connections between one phase of said source and said electromagnet for energizing the same, connections between the other phase of said source and the main field winding of each said motive means, operative electrical connections between the windings of said pickup means and control field winding of the corresponding said motive means, third electrical pickup means including a pendulum pivoted about an axis lying in the plane of one of said coordinate axes and responsive to a tilt of said member, a stator winding connected to said one phase of said source, a second winding carried by said pendulum and movable thereby in the field of said stator winding for developing a voltage in accordance with the movement of said pendulum, and means in one of said electrical connections for adding the pendulum voltage to thereby modify the operation of the corresponding motive means.

18. In gyroscopic apparatus adapted to be mounted on an unstable support, the combination of a gyroscope, a gimbal ring, an elastic element suspending said gyroscope in said ring for movement about an axis, a member mounted on said support for movement about coordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose a correcting torque on said gyroscope through at least one of said suspending elastic elements, several electrical connections between the windings of said pickup means and the corresponding said motive means, a pair of third electrical pickup means each including a pendulum pivoted about an axis lying in the plane of one of said coordinate axes and responsive to a tilt of said member, an energized stator winding corresponding to each pendulum, a rotor winding carried by each said pendulum and movable thereby in the field of the corresponding said stator winding for developing a voltage in accordance with the movement of said pendulum, and series connections between the said rotor windings and one of said electrical connections for adding the pendulum voltages to thereby modify the operation of the corresponding motive means.

19. In gyroscopic apparatus adapted to be mounted on an unstable support, the combination of a gyroscope, a gimbal ring, an elastic element suspending said gyroscope in said ring for movement about an axis, a member mounted on said support for movement about co-ordinate axes, one of which is substantially coincident with said first axis, an elastic element suspending said ring on said member for movement about a substantially vertical axis, electrical pickup means interposed between said gyroscope and said member and including an electromagnet creating a magnetic field and a pair of windings in said field responsive to relative movement between said electromagnet and said windings in different directions for inducing in each of said windings a voltage in accordance with said movement in the corresponding direction, a pair of electrical motive means connected to said member for driving the same about said coordinate axes to impose a correcting torque on said gyroscope through at least one of said suspending elastic elements, several electrical connections between the windings of said pickup means and the corresponding said motive means, a pair of third electrical pickup means each including a pendulum pivoted about an axis lying in the plane of one of said coordinate axes and responsive to a tilt of said member about the last-named axis, an energized stator winding corresponding to each pendulum, a rotor winding carried by each said pendulum and movable thereby in the field of the corresponding stator winding for developing a voltage in accordance with the movement of the corresponding pendulum, damping means for said pendulums, and series connections between the said rotor windings and one of said electrical connections for adding the rotor voltages to thereby modify the operation of the corresponding motive means.

20. In gyroscopic apparatus adapted to be mounted on an unstable support, the combination of a gyroscope, a gimbal ring, an elastic element suspending said gyroscope in said ring for movement about an axis, a tank mounted on said support for movement about coordinate axes, one of which is substantially coincident with said first axis, an elastic element suspending said ring in said tank for movement about a substantially vertical axis, a liquid contained in said tank submerging said gyroscope, gimbal ring and elastic elements, electrical pickup means interposed between said gyroscope and said tank and responsive to relative movement between them for developing a voltage in accordance with said movement, electrical motive means connected to said tank for driving the same about said coordinate axes to impose a correcting torque on said gyroscope through at least one of said suspending elastic elements, and operative electrical connections between said pickup means and said motive means.

No references cited.